W. W. CURTIS.
TEMPERATURE REGULATING DEVICE.
APPLICATION FILED FEB. 3, 1908.
1,000,720.
Patented Aug. 15, 1911.
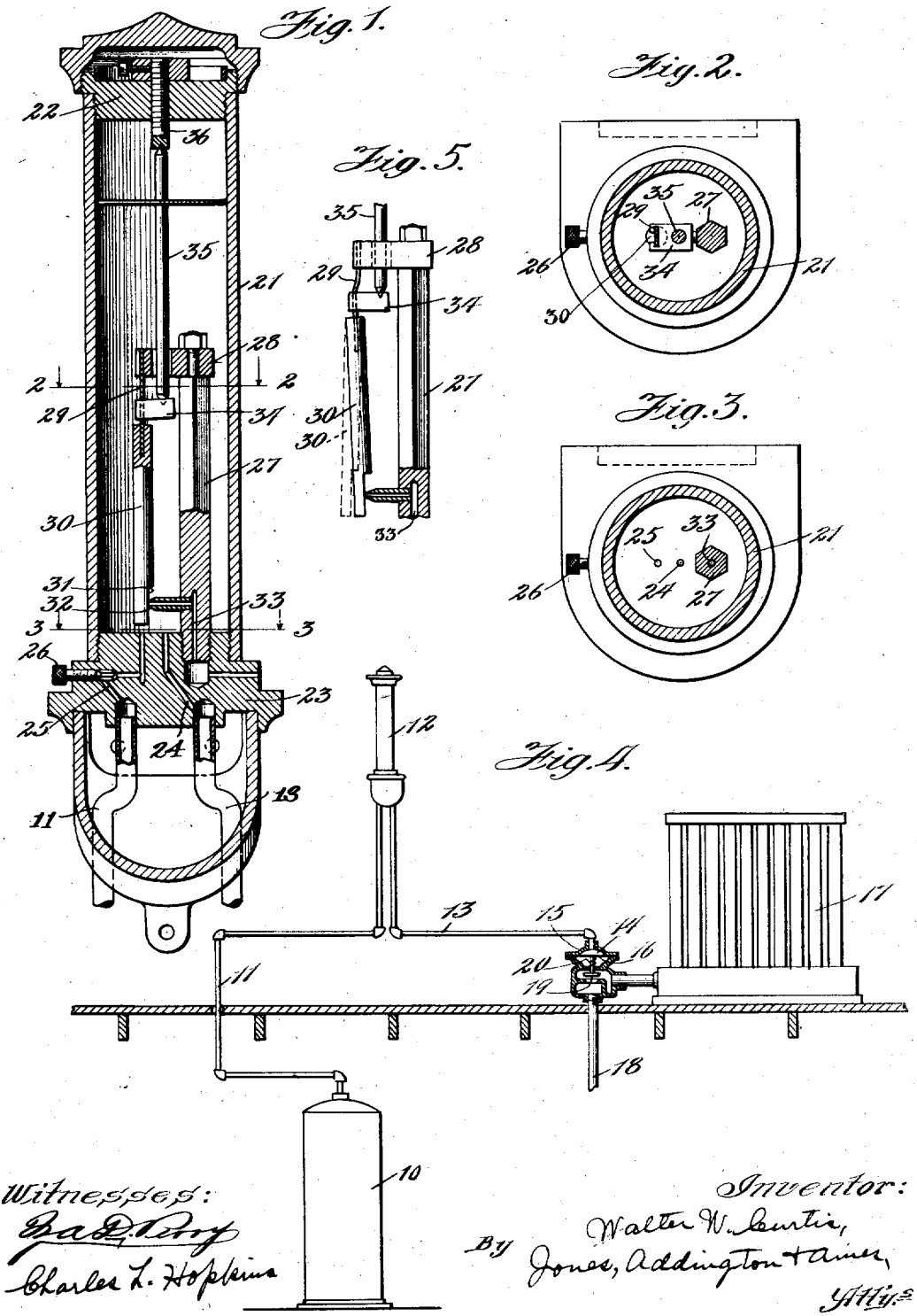

UNITED STATES PATENT OFFICE.

WALTER W. CURTIS, OF CHICAGO, ILLINOIS, ASSIGNOR TO NATIONAL REGULATOR COMPANY, OF CHICAGO, ILLINOIS, A CORPORATION OF ILLINOIS.

TEMPERATURE-REGULATING DEVICE.

1,000,720.  Specification of Letters Patent. Patented Aug. 15, 1911.

Application filed February 3, 1908. Serial No. 414,045.

*To all whom it may concern:*

Be it known that I, WALTER W. CURTIS, a citizen of the United States, residing at Chicago, in the county of Cook and State of Illinois, have invented new and useful Improvements in Temperature - Regulating Devices, of which the following is a full, clear, concise, and exact description, reference being had to the accompanying drawing, forming a part of this specification.

My invention relates to improvements in thermostatic devices designed to control the flow of a fluid, such as air under pressure, to or from a motor actuated thereby and operating means for controlling the action of heating apparatus.

In some cases, as for instance where the motor is arranged to govern the passage of steam to a heating radiator, it is desirable that the flow of the motor-actuating fluid shall be so controlled as to cause the motor to act positively, that is, so that when once started to open or close, the valve or other means for regulating the flow of heating medium will complete this movement before stopping or starting to move in the reverse direction. It is also important that the movement of the valve or the like shall be comparatively rapid, especially in the direction to admit steam to the radiator, because of the fact that if the valve be but slightly opened and the steam is therefore admitted slowly to the cold radiator, rapid condensation will occur without means for the passage of the water resulting therefrom out of the radiator.

The object of the present invention is, therefore, to provide thermostatically-actuated means for controlling the flow of motive fluid to or from a motor, which thermostatically-actuated means so operates as to cause the motor to move positively and also to move quickly in at least one direction.

In these drawings, Figure 1 is a longitudinal sectional view of my improved thermostat; Fig. 2 is a cross sectional view of the same on the line 2—2 of Fig. 1, looking in the direction indicated by the arrows; Fig. 3 shows a cross section on the line 3—3 of Fig. 1, looking in the direction indicated by the arrows; Fig. 4 illustrates a system employing the devices of my invention; and Fig. 5 is a detail view showing the valve in different positions.

In these drawings 10 is a tank containing fluid, preferably air, under pressure. From this tank a pipe 11 is run to the thermostat 12 located in the apartment, the temperature of which is to be controlled. From this thermostat extends a pipe 13 to the air chamber 14 of a motor 15. One side of the chamber 14 is formed by a diaphragm 16 adapted to be flexed by the pressure within the chamber when air is admitted thereto. The steam radiator 17 is connected by means of a pipe 18 with the steam generating apparatus (not shown), the flow of steam to the radiator being controlled by a valve 19 which is closed by the flexure of the diaphragm 16 when air under pressure is admitted to the chamber 14. When the pressure within this chamber is relieved the valve 19 is opened by a suitable spring 20.

My invention resides, when applied to such a system, in the thermostatically - controlled means for causing the air to flow to the motor or releasing the same from the motor, and thereby governing the admission of steam to the radiator or the cutting off of the same.

The thermostat 12 comprises a tube 21 of hard rubber or other material adapted to expand or contract under changes in temperature conditions. This tube is provided at one of its ends with a plug 22 screwing thereinto and at its opposite end with a plug 23 also screwing into the tube and having a passage 24 extending therethrough to the chamber within the tube. This passage is connected with the pipe 13 leading to the chamber 14 in the motor 15. The plug 23 is provided also with a passage 25 leading to the chamber of the device and provided with restricting means consisting of a screw 26 which, when screwed in, decreases the area of the passage at one point. This passage 25 communicates through the pipe 11 with the air tank 10. Within the tube 21, and secured to the plug 23, is arranged a standard 27 carrying upon its upper end a cross bar 28 to which is secured one end of a flat spring 29 carrying upon its opposite end a valve piece 30 comprising a bar having a flattened portion at 31. The tendency of the spring 29, if left to itself, would be to move the valve piece 30 toward the standard 27 and to hold the flattened portion 31 in contact with the valve seat 32. An exhaust passage 33, open at one end to the atmosphere, extends through the standard 27 and terminates at the valve seat 32, being therefore closed when the valve is seated. A block 34 is secured to the spring 29 at a point between its ends, and upon this block bears a thrust-rod 35, the opposite end of this rod resting in a depression in the end of a screw 36 which extends through the plug 22. This screw is provided with threads having very gradual pitch so that by turning the same a very nice adjustment of the pressure exerted by the thrust-rod 35 upon the block 34 may be secured.

The operation of the device may be described as follows: With the parts in the positions shown in Fig. 1, air under pressure fills the chamber within the thermostatic tube 21, the pipe 13, and the chamber 14 of the motor, holding the diaphragm 16 flexed and the valve 19 closed against its seat, thereby preventing access of steam to the radiator 17. When the temperature falls and steam is to be admitted to the radiator it is desirable that the valve 19 shall open quickly to its full extent, whereby rapid condensation of steam within the radiator without means for the exit of water therefrom, which would result if the steam was slowly admitted to a cold radiator, is prevented. This quick opening is accomplished as follows: The cooling of the thermostatic tube 21, by reason of the fall in temperature of the room, causes the tube 21 to contract, this contraction being transmitted through the rod 35 as a thrust upon the block 34, flexing the spring 29 in that portion thereof which is between the block 34 and the cross piece 28, as shown in Fig. 5. The downward thrust of the rod 35 thus tends to move the valve 31 away from its seat 32. This tendency to open the valve is, however, resisted for a time by the air pressure within the chamber of the thermostat, which tends to hold the valve to its seat. This causes the spring 29 to become flexed between the block 34 and the valve piece 30, storing up energy in this part of the spring. When sufficient energy is thus stored to overcome the tendency of the valve 31 to adhere to its seat because of the pressure within the chamber of the device, the valve will suddenly move away from its seat to the position shown in dotted lines in Fig. 5, and the air under pressure within the chamber will quickly exhaust through the passage 33 to the atmosphere. This permits the air in the pipe 13 to flow back toward the thermostat and the spring 20 to force the diaphragm 16 of the motor up and open the valve 19 quickly, thereby turning the steam into the radiator at full pressure at once. The air entering through the passage 25 from the tank 10 wastes through the exhaust port 33 while the steam valve 19 remains open, but this flow is negligible because of the restriction in the passage 25. The temperature of the air in the apartment will now begin to rise, resulting in the gradual extension of the thermostatic tube 21. This permits the thrust rod 35 to move upwardly under the influence of the spring 29, the valve piece 30 slowly approaching its seat. If the temperature rises beyond the point at which the device is adjusted to operate this valve at length approaches closely to its seat, whereupon the pressure in the chamber of the thermostat rises, due to the fact that less air escapes past the valve to the exhaust port than enters through the passage 25. When this pressure has reached a certain point the valve piece 30 is moved quickly thereby through the remainder of its path of movement to its seat. This prevents the further passage of air to the atmosphere through the exhaust port and permits pressure to build up in the chamber of the device and in the pipe 13 and chamber 14 of the motor, closing the valve 19 and shutting off the steam from the radiator 17.

It is to be understood that in some systems of steam heating it is not so important to have the steam shut off quickly from the radiator as it is to have it admitted quickly and completely thereto. This device accomplishes the quick and complete admission as well as the complete closing desired, and is sufficiently rapid in its closing action to meet the requirements of practical service.

Having thus described my invention, what I claim as new and desire to secure by Letters Patent is—

1. The combination with a fluid-pressure motor, of a device for controlling the flow of fluid to and from said motor, said device having a chamber communicating with said motor and provided with an inlet communicating with a source of supply of fluid under pressure, said device having also an exhaust port leading from said chamber of greater capacity than said inlet, a valve within said chamber exposed to the pressure therein and arranged to close said exhaust port and to be held to its seat by said pressure, and an energy storing device under tension, said device opposing the pressure in the chamber and tending to open said valve against said pressure, the tension of said device being varied by temperature changes.

2. The combination with a fluid-pressure motor, of apparatus for controlling the flow of fluid to and from said motor, said apparatus being provided with a chamber communicating with said motor and having an inlet to said chamber communicating with a source of supply of fluid under pressure and having also an exhaust port leading from said chamber of greater capacity than said inlet, a valve arranged to close said exhaust port and to be held to its seat by the pressure within said chamber, and an energy storing device under tension and arranged to have its tension varied by temperature changes, the tension of said device being opposed to the pressure in the chamber and tending to open said valve against said pressure.

3. The combination with a fluid-pressure motor, of a device for controlling the flow of fluid to and from said motor, said device having a chamber communicating with a source of supply of fluid under pressure and communicating also with said motor and provided with an exhaust port, a valve for said exhaust port arranged to be held thereto by the pressure within the chamber and opening against said pressure, means responsive to temperature changes for opening said valve, and elastic connection in which energy is stored between said valve and said temperature-responsive means, whereby said valve is caused to open quickly when the pressure within the chamber is overcome by the energy stored in said elastic connection.

4. The combination with a fluid-pressure motor, of a device for controlling the flow of fluid to and from said motor, said device having a chamber communicating with a source of supply of fluid under pressure and communicating also with said motor and provided with an exhaust port, a valve for said exhaust port arranged to be held thereto by the pressure within the chamber and opening against said pressure, means responsive to temperature changes for opening said valve, and elastic connection in which energy is stored between said valve and said temperature-responsive means upon a fall of temperature, whereby said valve is caused to open quickly when the pressure within the chamber is overcome by the energy stored in said elastic connection.

5. The combination with a fluid-pressure motor, of apparatus for controlling the flow of fluid to and from said motor, said apparatus having a chamber communicating with said motor and having an inlet to said chamber communicating with a source of supply of fluid under pressure and having also an exhaust port leading from said chamber of greater capacity than said inlet, a valve for said exhaust port, means tending to seat said valve, a thermostatic element for opening said valve against the pressure in said chamber, and elastic means in which energy is stored between said thermostatic element and said valve whereby said valve is made to open suddenly when the pressure in the chamber is overcome by said elastic means.

6. The combination with a fluid-pressure motor, of a thermostat having a chamber in communication with said motor, a source of supply of fluid under pressure also in communication with said motor, means for limiting the flow of fluid to said motor, said thermostat having also an exhaust port, a valve arranged to close said exhaust port and to be held to its seat by the pressure within said chamber, and yieldable means in which energy is stored by the thermostat for opening said valve against said pressure when said pressure is overcome by the energy stored in said yieldable means.

7. The combination with a fluid-pressure motor, of a thermostat having a chamber in communication with said motor, a source of supply of fluid under pressure also in communication with said motor, means for limiting the flow of fluid to said motor, said thermostat having also an exhaust port, a valve arranged to close said exhaust port and to be held to its seat by the pressure within said chamber, and yieldable means in which energy is stored by the thermostat upon a fall of temperature for opening said valve against said pressure when the same is overcome by the energy stored in said yieldable means.

8. The combination, with a fluid-pressure motor, of a chambered thermostat having a constantly open restricted inlet, a source of supply of fluid under pressure connected to said inlet, the chamber of said thermostat being in communication with said motor and having an exhaust port of greater capacity than said inlet, a valve within said thermostat arranged to close said exhaust port and to be held to its seat by the pressure within the thermostat, and yieldable means under tension arranged to open said valve against said pressure when said pressure is overcome thereby, the tension of said means being varied by said thermostat.

9. The combination with a fluid-pressure motor, of a hollow thermostat having an inlet communicating with a source of supply of fluid under pressure and provided with an adjustable restriction, said thermostat having also a port communicating with said motor and an exhaust port, a valve for closing said exhaust port, said valve being moved toward said exhaust port by the pressure within the thermostatic chamber, and yieldable means under tension arranged to move said valve away from said exhaust port, the tension of said yieldable means being varied by said thermostat.

10. The combination with a fluid-pressure motor, of means for controlling the flow of fluid to and from said motor, said means having a chamber communicating with a source of supply of fluid under pressure and with said motor, said chamber having an exhaust port of sufficient capacity to permit the flow of fluid therethrough faster than it enters the chamber from the source of supply, a valve for said exhaust port tending to seat itself, means responsive to temperature changes for unseating said valve, and resilient means interposed between said last-named means and said valve, whereby said valve is caused to open quickly against the pressure within the chamber.

11. In temperature regulating apparatus, the combination of a hollow thermostatic element having an inlet and having an outlet port of greater capacity than said inlet, and having also an exhaust port of greater capacity than said inlet, a valve within said thermostatic element for closing said exhaust port, and a spring for opening and closing said valve by changes of its tension, the tension of said spring being under the control of said thermostat.

12. In combination with a motor a thermostatic tube provided with a passage in communication with a source of fluid supply and having a passage communicating with said motor and an exhaust passage, means for restricting the flow of fluid through said first-mentioned passage, a support mounted within said tube, and yieldable means mounted on said support for controlling said exhaust passage.

13. In combination with a motor a thermostatic tube provided with a passage in communication with a source of fluid supply and having a passage communicating with said motor and an exhaust passage, means for restricting the flow of fluid through said first-mentioned passage, a post mounted within said tube, a support extending transversely from said post, and a spring member mounted on said support and adapted to control said exhaust passage.

14. In combination with a motor a thermostatic tube provided with a passage in communication with a source of fluid supply and having a passage communicating with said motor and an exhaust passage, means for restricting the flow of fluid through said first-mentioned passage, a post mounted within said tube, a support extending transversely from said post, a spring member mounted on said support, and a valve stem secured to the end of said spring and normally held against the valve seat of the exhaust passage by the pressure of the fluid with the tube and the tension of a portion of said spring.

15. In combination with a motor a thermostatic tube provided with a passage in communication with a source of fluid supply and having a passage communicating with said motor and an exhaust passage, means for restricting the flow of fluid through said first-mentioned passage, a post mounted within said tube, a support extending transversely from said post, a spring member mounted on said support, a valve stem secured to the end of said spring and normally held against the valve seat of the exhaust passage by the pressure of the fluid within the tube and the tension of a portion of said spring, and means whereby a predetermined degree of contraction of said tube causes said valve seat to quickly unseat and open said exhaust passage.

16. In a thermostatic tube provided with a valve controlled exhaust, a post mounted within said tube, an arm extending transversely therefrom, a spring member mounted on said arm, a valve secured at the lower end of said spring member normally closing said exhaust and holding it in such closed position by the combined action of the pressure within said tube and the tension of a portion of said spring, and means whereby contraction of said tube stores energy into the lower portion of said spring member until sufficient energy has been stored to force said valve quickly away from said exhaust passage.

17. In a thermostatic tube provided with a valve controlled exhaust, a post mounted within said tube, an arm extending transversely therefrom a spring member mounted on said arm, a valve secured at the lower end of said spring member normally closing said exhaust and holding it in such closed position by the combined action of the pressure within said tube and the tension of a portion of said spring, and means whereby contraction of said tube stores energy into the lower portion of said spring member until sufficient energy has been stored to force said valve stem quickly away from said exhaust passage, said means comprising a block mounted on said spring intermediate its ends, and a connecting rod bearing on said block and adapted to be forced downwardly by the contraction of said tube.

In witness whereof, I have hereunto subscribed my name in the presence of two witnesses.

WALTER W. CURTIS.

Witnesses:
M. L. FARRAR,
C. L. HOPKINS.

It is hereby certified that in Letters Patent No. 1,000,720, granted August 15, 1911, upon the application of Walter W. Curtis, of Chicago, Illinois, for an improvement in "Temperature-Regulating Devices," an error appears in the printed specification requiring correction as follows: Page 4, line 50, the word "with" should read *within;* and that the said Letters Patent should be read with this correction therein that the same may conform to the record of the case in the Patent Office.

Signed and sealed this 12th day of September, A. D., 1911.

[SEAL.]

E. B. MOORE,
*Commissioner of Patents.* and resilient means interposed between said last-named means and said valve, whereby said valve is caused to open quickly against the pressure within the chamber.

11. In temperature regulating apparatus, the combination of a hollow thermostatic element having an inlet and having an outlet port of greater capacity than said inlet, and having also an exhaust port of greater capacity than said inlet, a valve within said thermostatic element for closing said exhaust port, and a spring for opening and closing said valve by changes of its tension, the tension of said spring being under the control of said thermostat.

12. In combination with a motor a thermostatic tube provided with a passage in communication with a source of fluid supply and having a passage communicating with said motor and an exhaust passage, means for restricting the flow of fluid through said first-mentioned passage, a support mounted within said tube, and yieldable means mounted on said support for controlling said exhaust passage.

13. In combination with a motor a thermostatic tube provided with a passage in communication with a source of fluid supply and having a passage communicating with said motor and an exhaust passage, means for restricting the flow of fluid through said first-mentioned passage, a post mounted within said tube, a support extending transversely from said post, and a spring member mounted on said support and adapted to control said exhaust passage.

14. In combination with a motor a thermostatic tube provided with a passage in communication with a source of fluid supply and having a passage communicating with said motor and an exhaust passage, means for restricting the flow of fluid through said first-mentioned passage, a post mounted within said tube, a support extending transversely from said post, a spring member mounted on said support, and a valve stem secured to the end of said spring and normally held against the valve seat of the exhaust passage by the pressure of the fluid with the tube and the tension of a portion of said spring.

15. In combination with a motor a thermostatic tube provided with a passage in communication with a source of fluid supply and having a passage communicating with said motor and an exhaust passage, means for restricting the flow of fluid through said first-mentioned passage, a post mounted within said tube, a support extending transversely from said post, a spring member mounted on said support, a valve stem secured to the end of said spring and normally held against the valve seat of the exhaust passage by the pressure of the fluid within the tube and the tension of a portion of said spring, and means whereby a predetermined degree of contraction of said tube causes said valve seat to quickly unseat and open said exhaust passage.

16. In a thermostatic tube provided with a valve controlled exhaust, a post mounted within said tube, an arm extending transversely therefrom, a spring member mounted on said arm, a valve secured at the lower end of said spring member normally closing said exhaust and holding it in such closed position by the combined action of the pressure within said tube and the tension of a portion of said spring, and means whereby contraction of said tube stores energy into the lower portion of said spring member until sufficient energy has been stored to force said valve quickly away from said exhaust passage.

17. In a thermostatic tube provided with a valve controlled exhaust, a post mounted within said tube, an arm extending transversely therefrom a spring member mounted on said arm, a valve secured at the lower end of said spring member normally closing said exhaust and holding it in such closed position by the combined action of the pressure within said tube and the tension of a portion of said spring, and means whereby contraction of said tube stores energy into the lower portion of said spring member until sufficient energy has been stored to force said valve stem quickly away from said exhaust passage, said means comprising a block mounted on said spring intermediate its ends, and a connecting rod bearing on said block and adapted to be forced downwardly by the contraction of said tube.

In witness whereof, I have hereunto subscribed my name in the presence of two witnesses.

WALTER W. CURTIS.

Witnesses:
M. L. FARRAR,
C. L. HOPKINS.

It is hereby certified that in Letters Patent No. 1,000,720, granted August 15, 1911, upon the application of Walter W. Curtis, of Chicago, Illinois, for an improvement in "Temperature-Regulating Devices," an error appears in the printed specification requiring correction as follows: Page 4, line 50, the word "with" should read *within;* and that the said Letters Patent should be read with this correction therein that the same may conform to the record of the case in the Patent Office.

Signed and sealed this 12th day of September, A. D., 1911.

[SEAL.]

E. B. MOORE,
*Commissioner of Patents.*

It is hereby certified that in Letters Patent No. 1,000,720, granted August 15, 1911, upon the application of Walter W. Curtis, of Chicago, Illinois, for an improvement in "Temperature-Regulating Devices," an error appears in the printed specification requiring correction as follows: Page 4, line 50, the word "with" should read *within;* and that the said Letters Patent should be read with this correction therein that the same may conform to the record of the case in the Patent Office.

Signed and sealed this 12th day of September, A. D., 1911.

[SEAL.]

E. B. MOORE,
*Commissioner of Patents.*